United States Patent [19]

Packer

[11] Patent Number: 4,991,467
[45] Date of Patent: Feb. 12, 1991

[54] DIAMOND TWIST DRILL BLANK

[75] Inventor: Scott M. Packer, Provo, Utah

[73] Assignee: Smith International, Inc., Houston, Tex.

[21] Appl. No.: 393,162

[22] Filed: Aug. 14, 1989

[51] Int. Cl.⁵ .............................................. B23P 15/32
[52] U.S. Cl. .............................. 76/108.6; 76/DIG. 11; 76/DIG. 12; 408/144; 408/199
[58] Field of Search ............. 76/108 T, 108 R, 101 A, 76/DIG. 12, DIG. 11; 408/144, 199

[56] References Cited

U.S. PATENT DOCUMENTS

| | | | |
|---|---|---|---|
| 1,887,373 | 11/1932 | Emmons et al. | 408/144 |
| 1,887,374 | 11/1932 | Emmons et al. | 408/144 |
| 1,977,845 | 10/1934 | Emmons | 408/144 |
| 4,527,643 | 7/1985 | Horton et al. | 408/144 |
| 4,627,503 | 12/1986 | Horton | 175/329 |
| 4,762,445 | 8/1988 | Bunting et al. | 408/144 |

FOREIGN PATENT DOCUMENTS

| | | | |
|---|---|---|---|
| 3232686 | 3/1984 | Fed. Rep. of Germany | 408/144 |
| 2085769 | 5/1982 | United Kingdom | 408/144 |

Primary Examiner—Roscoe V. Parker
Attorney, Agent, or Firm—Smith International, Inc.

[57] ABSTRACT

A diamond tipped twist drill for drilling holes in a work piece consists of a body forming a pair of flutes, each flute forming a channel that essentially parallels the flutes. Each channel ends at an aperture formed in the body nearest a cutting end of the drill. Diamond material is pressed into the flutes and through the aperture. Subsequent machining at the cutting end of the drill bit body exposes the sintered diamond forming a finished diamond cutting tip for the twist drill.

11 Claims, 2 Drawing Sheets

DIAMOND TWIST DRILL BLANK

BACKGROUND OF THE INVENTION

I. Field of the Invention

This invention relates to drilling tools and more particularly to helically fluted twist drills.

Helically fluted twist drills are the most commonly used drilling tools and are generally required to perform severe machining operations under extremely adverse conditions. The cutting end of a helically fluted twist drill includes a pair of cutting lips on opposite surfaces of an intermediate web, the width of which is typically 12 to 20 percent of the diameter. The chisel edge of the twist drill extends obliquely across the center of the web. The foregoing drills are typically long and slender and the helical flutes constitute a column eccentricity that tends to reduce the rigidity of the drill under axial thrust loads.

Oppositely directed cutting surfaces positioned at the cutting end of the shaft of the drill are subjected to axial and torsional loads which create material demands on the fabrication of the drill tool. Obviously the material of the cutting lips should be as hard as possible to cut a work piece and it should be heat resistant as well to maintain the cutting edge of the drill at elevated temperatures. Moreover the material of the body of the drill shaft must be both rigid and tough to resist deflection and to maintain the integrity of the drill under loads while the drill is being used. The foregoing requirements have resulted in compromises in material selection since hard materials tend to be brittle while tough materials tend to wear quite easily.

II. Description of the Prior Art

The prior art teaches a combination of materials having the characteristics of hardness and wear-resistance at the cutting surfaces and toughness and rigidity of the body and shaft. It has been previously proposed to form the cutting surfaces of one material and the body and shaft of another. This has resulted in a variety of combinations such as tungsten carbide or diamond inserts or tips on carbon steel or carbide shafts. These combinations while individually useful have a common disadvantage, i.e. the braze connection between the insert or tip and a shaft. Tungsten carbide can be soldered or brazed directly to the steel or carbide shaft. However a diamond tip or insert must first be adhered to a carbide substrate which is in turn soldered or brazed to the shaft. Diamond particles are typically formed into a compact or PCD (polycrystalline diamond disc) and bonded to a carbide substrate with a metallic catalyst in a high pressure-high temperature press. At atmospheric pressures however the metal which catalyzes the bonding of the diamond particles to each other and to the substrate in the press will also catalyze the conversion of diamond to graphite at temperatures above 700 degrees centigrade which will cause disintegration of the PCD compact. Accordingly a low temperature solder or braze connection is used to attach the substrate to the shaft. The aforementioned diamond discs as well as the diamond insert stud blanks for example are fabricated from a tungsten carbide substrate with a diamond layer sintered to a face of a substrate the diamond layer being composed of polycrystalline material.

The synthetic polycrystalline diamond layer is manufactured by Megadiamond Industries, Inc., a wholly owned division of Smith International, Provo, Utah. Another source of polycrystalline diamond is manufactured by the specialty material department of General Electric Company of Worthington, Ohio. The foregoing drill cutter blank is known by the trademark name of Stratapax Drill Blank.

Two examples of patents assigned to Megadiamond describe cutting elements for drilling holes. U.S. Pat. No. 4,527,643 teaches a cutting element for drilling holes which consists of five cutting edges which are comprised of polycrystalline diamond or the like mounted to a central carbide substrate of similar hard material held by a rotatable shaft which can be inserted into a drilling machine. The polycrystalline material is then supported with respect to torsional forces exerted upon it during drilling.

U.S. Pat. No. 4,627,503 describes a polycrystalline diamond and metal element for use as a cutting element for drilling holes or similar uses. The cutting element comprises a polycrystalline diamond center portion sandwiched between metal. The metal side portion is made from a soft metal having a Young's Modulus less than approximately 45 times 10 to the sixth power and is selected from a group comprising cobalt, nickel, iron, copper, silver, gold, platinum, palladium and alloys of these metals in metallic compounds containing these metals.

Both of these recently issued patents utilize a braze type bonding element to secure the diamond cutters within a drill blank. Typically a low temperature solder or braze connection is used to attach the substrate to a shaft such as the shaft of a helical twist drill. This braze connection limits the effective life of such drilling tools since it is softer than either the substrate or the shaft. The braze thus becomes the weakest point of the tool construction and the limiting factor in the tool usage.

U.S. Pat. No. 4,762,445 teaches a helically fluted twist drill apparatus in which offset opposed veins of sintered abrasive particulate, such as diamond, are embedded within a drill blank made of a less abrasive material such as carbide. The non-aligned veins of abrasive material, themselves intersect through juxtapositioning adjacent the point and web of the drill. The veins of diamond are 180 degrees opposed across the tip of the helical drill blank. The opposing veins intersect at the center or axis of the helical drill to provide a concentration of diamond at the tip of the twist drill.

A disadvantage of the foregoing patent is that the veins of diamonds are relatively shallow at the tip of the twist drill and tend to wear out rather quickly.

The present invention overcomes the problems of the foregoing prior art by providing, for example, a concentration of diamond in each of a pair of flutes of a twist drill. The two helical grooves join through a hole drilled through the center of the blank so that diamond is continuous, i.e.; in one groove, through the center to the opposite groove thereby providing a continuous layer of diamond across the cutting end of the twist drill.

SUMMARY OF THE INVENTION

An object of the present invention is to provide a helically fluted twist drill with a diamond cutting surface.

More particularly, it is an object of the present invention to provide a helically fluted twist drill with helical grooves in the flutes that are filled with compacted polycrystalline diamond. The diamond material passes through the axis of the twist drill from one flute to the other flute thus providing diamond across the cutting end of the twist drill.

It is another object of the present invention to provide a method of applying polycrystalline diamond powder in a groove formed along the helical flutes; the powder passing through the axis of the cutting end of the bit to provide a diamond cutting surface across the cutting end of the bit.

The invention consists of a helically fluted twist drill with a first drill blank forming a first cutting end and a second base end. The drill blank further forms at least a pair of flutes. The drill blank is additionally formed from a relatively tough material. A channel is formed within each of the flutes. The channels substantially parallel the helix. The flutes extend from an outside peripheral edge formed by the drill blank toward a central axis of the blank. The channels further intersect one another at an apex of the first cutting end of the blank adjacent an axis of the blank. Diamond powder material is compacted within the channels and sintered in a press, the channels being previously formed in the flutes.

The diamond material thereby forms a cutting edge continuously across the first cutting end of the blank where the flutes terminate at the cutting end. The drill blank is metallurgically bonded at the base end to a drill shank thereby completing the fluted twist drill.

Alternatively, the diamond material may be pre-sintered and placed in the helically formed grooves; the pre-sintered diamond is subsequently pressed.

An advantage then of the present invention over the prior art is the application of diamond within the helix of the flutes of a twist drill the diamond material passing over the apex of the cutting end of the bit to an identical channel formed in the opposite flute thus providing a continuous ribbon of diamond material for the cutting end of the bit.

Yet another advantage of the present invention over the prior art is the method in which a channel is formed within the helical pattern of the flutes the channel terminating at an aperture formed between the flutes at the center of the cutting end to provide a continuous band of polycrystalline diamond material across the cutting end of the bit. After the diamond is sintered in a press within the helical grooves the material above the sintered diamond layer is then removed to expose the diamond material formed in the channels and through the aperture thus providing a sharpened diamond cutting end to the drill blank.

The above noted objects and advantages of the present invention will be more fully understood upon a study of the following description in conjunction with the detailed drawings.

DESCRIPTION OF THE PREFERRED EMBODIMENTS AND BEST MODE FOR CARRYING OUT THE INVENTION

Figure 1:
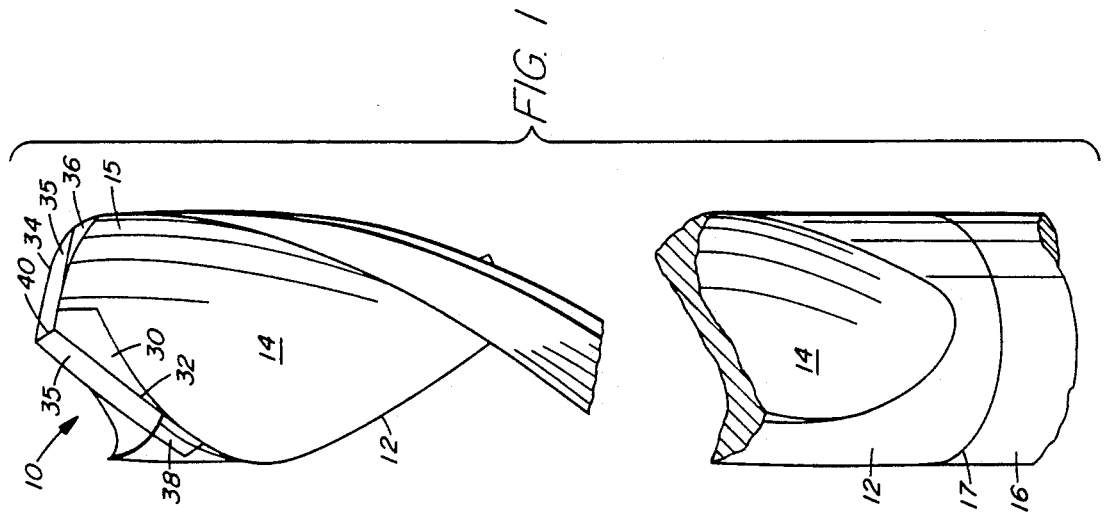
FIG. 1 is a perspective view of a fluted twist drill with a diamond cutting end.

The diamond twist drill of FIG. 1 generally designated as 10 consists of a twist drill blank body 12 having, for example, a pair of flutes 14 on opposite sides of the twist drill 10. The body 12 of the twist drill may for example be fabricated from a hard and tough material such as tungsten carbide. The cutting end 15 of the blank 12 has a sintered polycrystalline diamond 30 pressed in a helically formed groove generally designated as 18 formed in the blank body 12. Cutting lips 32 and 34 are ground into the sintered diamond material 30 formed in the cutting end 15 of the drill blank 12. The tungsten carbide drill blank may then be metallurgically bonded to a steel or carbide drill shank 16 along juncture 17. The metallurgical bond may, for example, be a braze.

Figure 2:
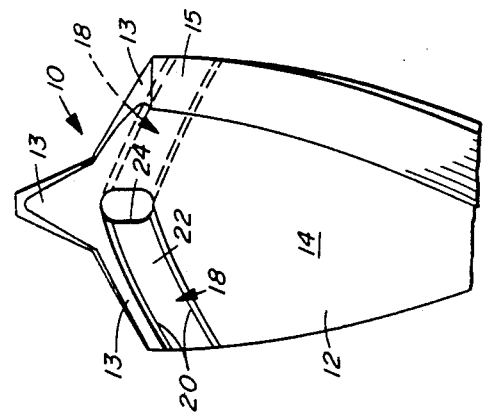
FIG. 2 is a partially broken away perspective view of a drill blank with the helical channels formed in the flutes of the blank, the channels leading to an aperture drilled between the flutes and the cutting end of the drill blank.

Turning now to FIG. 2 the tungsten carbide drill blank 10 is formed with, for example, a pair of helically configured grooves 18 formed in the flutes 14 closest to the cutting end 15 of the blank body 12. With reference to both FIGS. 2 and FIG. 4, the helically formed groove 18 has an identical helically formed groove 18 on the other side of the drill blank. The helically formed grooves 18 join at the axis of the drill blank at aperture 24 formed in cutting end 15 of the body 12. The sides 20 of the helical groove 18 are preferably sloped from the flutes 14 toward the bottom 22 of the groove 18. Identical sloped sides 20 are formed in the opposing helix. The reason for the sloped sides 20 is to assure that the polycrystalline diamond powder material is packed into the groove without any possibility of voids.

If the sides of the groove were 90 degrees to the bottom 22 of the groove then the sharp 90 degree corners could cause voids in the diamond material.

Figure 3:
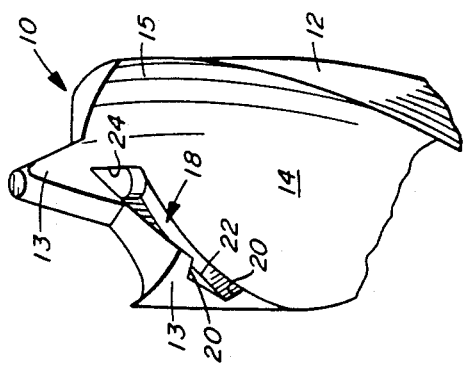
FIG. 3 is a partially broken away perspective view of a drill blank with the channels compacted with polycrystalline diamond powder material, the diamond material passing through the aperture formed between the flutes to the channel in the opposite flute therefore providing a continuous band of diamond.
Figure 5:
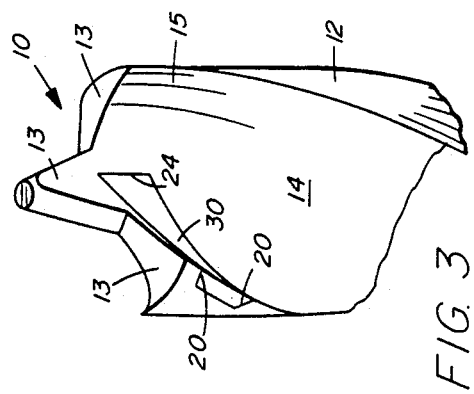
FIG. 5 is a view illustrating the end of the finished twist drill showing the flutes formed in the drill.

With reference now to FIG. 3 the grooves 18 and the aperture 24 are compacted with diamond powder 30 and sintered in a press. The polycrystalline diamond material 30 then is formed in the helical grooves 18 and through the aperture 24 near the cutting end 15 of the tungsten carbide blank body 12. A solid mass of diamond is thus formed from one side of the drill blank to the other through the aperture 24 formed in the drill blank. The drill blank is then machined to remove portion 13 above the grooves 18 (FIGS. 2, 3 and 4) thus exposing the sintered diamond material 30 formed in the grooves 18 and aperture 24. A finish grinding operation forms the cutting lips 32 and 34 in the cutting end 15 of the tungsten carbide blank 12 (not shown). The grinding process also forms the cutting gage surface 36 and 38 on opposing sides of the cutting end 15. In addition, a chisel edge 40 is formed obliquely across the apex of the cutting end 15. Cutting lip surfaces 33 and 35 are so configured to relieve the area immediately behind cutting lips 32 and 34.

Figure 6:
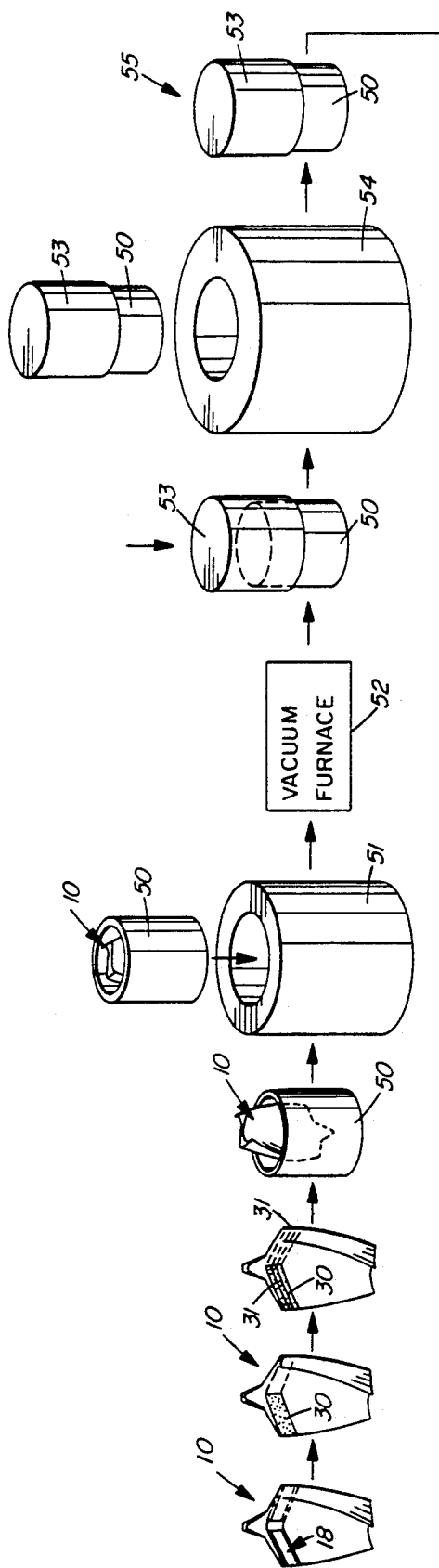
FIG. 6 is a semi-schematic diagram of the process steps involved to fabricate the diamond twist drill.
Figure 6:
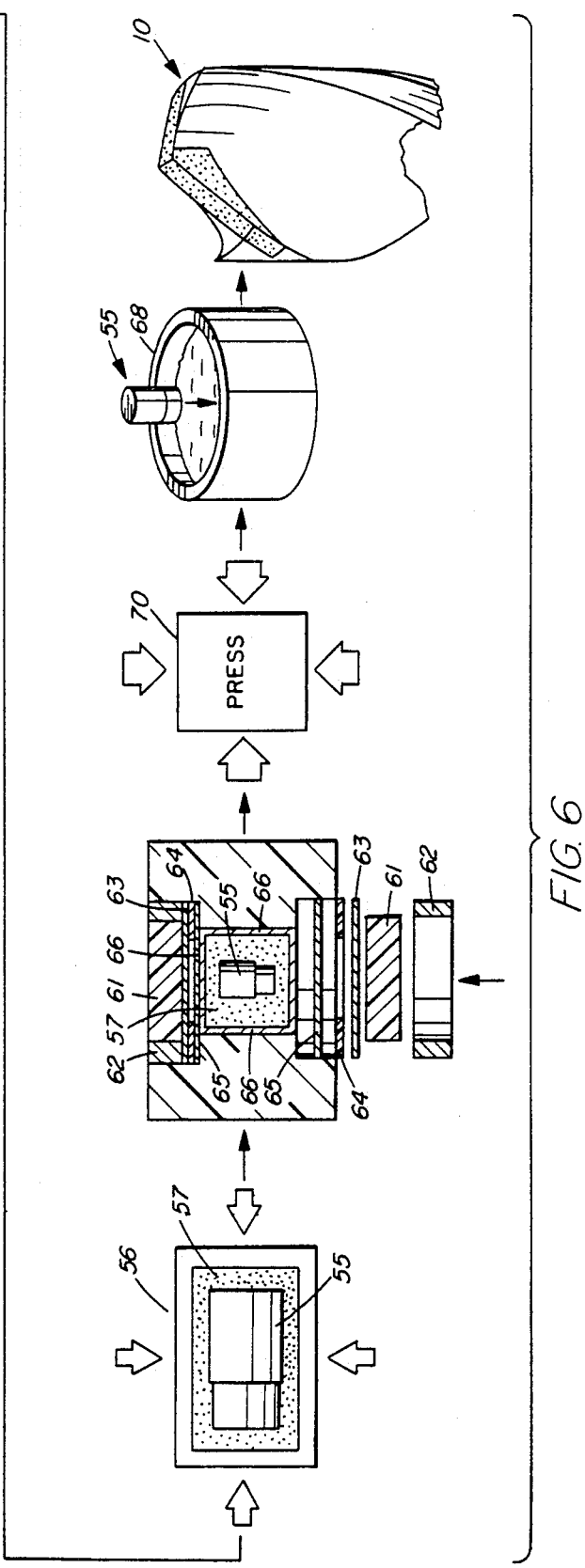

What follows is a process of forming, for example, a ⅜ diamond twist drill. Referring now to FIG. 6, a carbide blank having, for example, two flutes formed in the blank is formed slightly oversize (by 30 or 40 thousands) on the diameter of the twist drill blank. The twist drill is machined to the proper diameter after the diamond sintering process is completed.

As indicated before, the twist drill blank body 12 is preferably formed from a tungsten carbide material. The tungsten carbide blank is formed with an aperture 24 towards the cutting end 15 of the drill blank. (See FIG. 2). The helically formed groove 18 is formed in each of the flutes 14 with a depth of about 50 thousands and a width of the groove 18 of about 0.125 thousands of an inch, the sidewalls 20 are sloped from a narrow portion at the bottom 22 of the helical groove 18 to a wider opening at the surface of the flutes 14. As indicated before the sloped sidewall surfaces are so configured to assure that the polycrystalline diamond powder is packed in the groove without voids. The diamond material is preferably polycrystalline diamond powder having a size range from 3 to 60 microns. The preferred size range of the powder is from 4 to 16 microns. The binder for the diamond powder is cobalt. A ratio of cobalt to diamond is 6 to 15 percent cobalt. The percentage of cobalt is preferred to be 13 percent. A gap filling material of smaller sized diamond powder may be used. The gap filling diamond powder is preferred to be from 1 to 3 microns in size. The diamond powder and cobalt is then mixed with a small percentage of wax binder mixed in. The percentage of wax binder is about 1 percent.

The flutes of the tungsten carbide blank or body 12 are preferably prepared by breaking the corners of the flutes (not shown). The reason for "dulling" the corners of the flutes will become apparent with further discussion of the process. The mixed diamond powder, cobalt and wax is then trawled into the grooves 18 and through the aperture 24 of the blank 12.

After the mixture is trawled into the grooves and through the aperture 24 a "getter" is used to form a better diamond bond. The "getter" is a reactive metal that reacts with contaminates and oxides to facilitate better diamond bonding. The diamond getters go after the impurities in the mix to facilitate or achieve a better bond. A typical getter material is selected from the group consisting of zirconium, columbium, tantalum and hafnium. For example, a wire 31 is formed of the columbian getter material and laid over the diamond powder pressed in the grooves 18 formed in both of the flutes 14. The wire goes from end to end of the groove 18 in each of the flutes. The blank is then dropped into a deep draw can 50 made from the reactive metals such as columbium. The can 50 then acts also as a "getter" to minimize contaminates and to gain better diamond bond. The twist drill body 12 in the can is then run through a die to make the blank more compact. The blank 12 housed within the compressed can 50 then is run through what is known as a "dewax" cycle. The can is placed in a vacuum furnace 52. The dewax cycle takes approximately 12 hours. To be more specific, the temperature is slowly ramped up to 400 degrees centigrade for 2 hours, the temperature then is increased to 620 degrees centigrade for approximately one and a half hours, then the can 50 is allowed to cool for an additional 4 hours. The process again takes about 12 hours with a 4 to 5 hour slow cool down from a maximum temperature of 620 degrees centigrade. After the can 50 is taken from the vacuum furnace 52 another open ended can 53 of, for example, columbian material is placed over the compressed can 50.

The second can 53 of columbium then is run through a die to completely seal the second can 53 over the first can 50. The sealed can containing the blank 12 and now generally designated as 55 is then run through a pre-compact stage 56. The can 55 is first surrounded by salt 57 then is put in a pre-compact press 56 to further compact the can 55. The can is subjected to around 100 thousands ksi (100 thousand pounds per square inch) in the pre-compact press. The range of force on the can, may be for example, 50 to 100 thousand pounds per square inch. This assures that the blank 12 trapped within the columbium cans 50 and 53 is as dense as possible prior to the sintering process. The compressed can 55 is now ready for the sintering process. The reason the flute edge's are dulled is to prevent the columbium cans from being cut during the pre-compaction stage.

The can 55 is loaded into a pyrophyllite cube. The cube generally designated as 60 is packed with salt rings 57 and lined with a graphite material 66. The cube 60 is then capped with a titanium ring 65 followed by a mica ring baffle 64 and another titanium ring 63. A relatively thick steel ring 62 surrounds a pyrophyllite cap material 61. Both ends of the pyrophyllite cube have the same assembly thus closing in the can 55 within the salt rings 57 in the center of the pyrophyllite cube 60. The assembled cube 60 then goes to the press 70. The cube 60 is then pressed at a temperature of about 1,300 to 1,600 degrees centigrade at a pressure of about 1 million pounds per square inch.

The time of the press is approximately 10 minutes. In a specific example, the temperature is ramped up to 1,500 degrees centigrade for about 4 minutes, the cube 60 is held at temperature of 1,500 degrees centigrade about 1 minute and then allowed to cool down for approximately 5 minutes. An important aspect of this process is that the heat up be relatively slow with a slow cool down period. This is done primarily to reduce residual stresses within the finished twist drill 10.

The sintered can 55 is subsequently broken out of the phyrophyllite cube 60. The sintered drill blank body 12 is still housed within the cans 50 and 53 of columbium material. The enclosed twist drill blank 12 is then dropped into a bath of fused sodium hydroxide. The sodium hydroxide serves to remove the columbium can material and the columbian wire material wound around the helix groove filled with diamond.

The sintered drill blank generally designated as 10 is then finished by machining the cap 13 from the cutting end 15 to expose the sintered diamond 30 within the helical grooves 18 in both of the flutes 14 (not shown).

The sharpened twist drill blank 10 is then brazed to a drill shank 16 to finish the product as shown in the perspective views of FIGS. 1 and 3.

Figure 4:
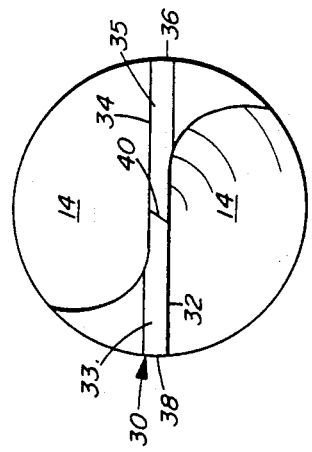
FIG. 4 is a cross-section of a drill blank with the grooves formed following the helix of the twist drill with the aperture formed through the end of the drill leading to a groove formed in the opposite flute.

An alternative embodiment may use a sintered polycrystalline piece shaped to conform to the helix groove 18 and aperture 24 as illustrated with respect the FIGS. 2 and 4.

The pre-sintered polycrystalline diamond may be fabricated using a patented process, U.S. Pat. No. 4,797,241 assigned to Megadiamond, a wholly owned division of Smith International and incorporated herein by reference.

The tungsten carbide body 12 may then be two separate pieces divided down the center of the grooves 18 (not shown). The pre-sintered and pre-shaped polycrystalline piece is placed in the conforming bottom half of the groove in the separated body 12 followed by placing the top portion containing the other half of the groove completing the assembly (not shown). The assembly is then placed in a high temperature/high pressure press to secure the diamond segment in the helically shaped grooves.

The sintered blank is then machined to remove the top portion at the cutting end of the blank to expose the diamond material.

It will of course be realized that various modifications can be made in the design and operation of the present invention without departing from the spirit thereof. Thus, while the principal preferred construction and mode of operation of the invention have been explained in what is not considered to represent its best embodiments, which have been illustrated and described, it should be understood that within the scope of the appended claims, the invention may be practiced otherwise than as specifically illustrated and described.

What is claimed is:

1. A helically fluted diamond twist drill comprising:
   a first drill blank forming a first cutting end and a second base end, said drill blank further forming at least a pair of flutes, said drill blank being formed from a relatively tough material,
   a channel is formed within each of said flutes, said channels substantially parallel the helix of said flutes from an outside peripheral edge formed by said drill blank to a central axis of said blank, said channels further intersect one another at the apex of said first cutting end of said blank adjacent on axis of said blank, and
   diamond matrix material is secured within said channels formed in said flutes by diamond sintering means, said diamond matrix material thereby forming a cutting edge continuously across the first cutting end of said blank where said flutes terminates at said cutting end.

2. The invention as set forth in claim 1, wherein, said diamond matrix material is a matrix of polycrystalline diamond powder and cobalt pressed into said channels and said aperture, the diamond matrix being subsequently sintered to said first drill blank.

3. The invention as set forth in claim 1, wherein, said relatively tough material of said fluted drill blank is tungsten carbide.

4. A diamond twist drill comprising a first cutting end and a second base end, said twist, drill forming helical flutes, said twist drill further forming helical channels in said flutes, said channels being filled with diamond material that is sintered within said channels by sintering means, said diamond filled channels interconnect through an axis of said twist drill thereby providing diamond completely across the apex of said first cutting end of said twist drill.

5. A process for forming a diamond twist drill comprising the steps of:
   forming a twist drill blank of hard metal, said drill blank having a first cutting end and a second base end, said twist drill blank forming at least a pair of flutes from said first cutting end and extending toward said base end,
   forming at least a pair of channels in said flutes, said channels extend from a peripheral edge of said flutes to an axis of said twist drill, said channels substantially follow the helical path of said flutes, said channels further are formed between said first cutting end and said base end, said channels being positioned nearest said cutting end,
   forming an aperture by said twist drill blank, said aperture being transverse to and through said axis, said aperture further intersects each of said helically formed channels at said axis of said twist drill blank,
   filling said channels formed in said flutes and said aperture formed by said drill blank with diamond material,
   bonding said diamond material in said channels and said aperture in said drill blank in a press, and
   machining said first cutting end of said twist drill blank to expose said diamond material sintered in said channels and through said aperture formed by said drill blank thereby providing a diamond cutting edge completely across the apex of said first cutting end of said drill blank.

6. The process as set forth in claim 5, wherein, said hard metal is tungsten carbide.

7. The process as set forth in claim 5, wherein, said diamond material is polycrystalline diamond.

8. The process as set forth in claim 5, wherein, said diamond material is a matrix of polycrystalline diamond powder and cobalt.

9. The process as set forth in claim 5 further comprising the step of forming sloped side walls for said channels formed in said flutes, said channel being narrower in the bottom of said channel than a width of said channel at a surface formed by said flute, said sloped side walls assure compaction of said polycrystalline diamond matrix without voids.

10. The process as set forth in claim 5 further comprising the step of metallurgically bonding a drill shank to said second base end of said drill blank.

11. The process as set forth in claim 10, wherein, said metallurgical bond is a braze.

* * * * *